(12) United States Patent
Ekern et al.

(10) Patent No.: US 6,530,622 B1
(45) Date of Patent: Mar. 11, 2003

(54) BIOMECHANICAL VEHICLE SEAT

(75) Inventors: David F. Ekern, Plymouth, MI (US); Srinivas R. Bidare, Novi, MI (US); John J. Flannery, Fenton, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/811,062

(22) Filed: Mar. 16, 2001

(51) Int. Cl.[7] .................................................. A47C 7/46
(52) U.S. Cl. ............................ 297/284.4; 297/284.1; 297/284.8; 297/354.11
(58) Field of Search ........................ 297/284.1, 284.3, 297/284.4, 284.8

(56) References Cited

U.S. PATENT DOCUMENTS

| | | | |
|---|---|---|---|
| 3,880,463 A | * 4/1975 | Shephard et al. | 297/284.7 |
| 4,007,962 A | * 2/1977 | Müller-Deisig | 297/301.2 |
| 4,564,235 A | 1/1986 | Hatsutta et al. | |
| 5,026,116 A | 6/1991 | Dal Monte | |
| 5,058,953 A | * 10/1991 | Takagi et al. | 297/284.4 |
| 5,120,109 A | * 6/1992 | Rangoni | 294/284.3 |
| 5,385,388 A | * 1/1995 | Faiks et al. | 297/301.3 |
| 5,411,317 A | 5/1995 | Faust et al. | |
| 5,452,868 A | 9/1995 | Kanigowski | |
| 5,505,520 A | 4/1996 | Frusti et al. | |
| 5,556,168 A | * 9/1996 | Dinsmoor, III et al. | 297/440.2 |
| 5,558,399 A | 9/1996 | Serber | |
| 5,836,651 A | * 11/1998 | Szerdahelyi et al. | 297/410 |
| 6,082,823 A | 7/2000 | Aumont et al. | |

FOREIGN PATENT DOCUMENTS

EP    0353210    1/1990

\* cited by examiner

*Primary Examiner*—Peter M. Cuomo
*Assistant Examiner*—Joseph Edell
(74) *Attorney, Agent, or Firm*—Foley & Lardner

(57) ABSTRACT

A vehicle seat includes posture enhancing systems to increase occupant comfort. In addition to pelvis support, the seat includes a pivotable thorax and a height adjustment therefor, having a range of adjustment of about 100 mm to accommodate different female and male occupants having different skeletal lengths. The correct positioning of the second pivot point is designed to provide a lumbar curvature which simulates that of a standing occupant. In its most simple form, the seat includes a pelvis support, a thorax pivot mechanism to allow forward movement of the thorax area and reclining of the shoulders and a linear actuator mechanism to allow accurate positioning of this pivot mechanism for the skeletal height for the occupant.

16 Claims, 8 Drawing Sheets

BIOMECHANICAL VEHICLE SEAT

CROSS REFERENCE TO RELATED APPLICATIONS

None.

BACKGROUND OF THE INVENTION

1. Field of the Invention

The present invention relates generally to the art of vehicle seating and more particularly to the back portion of a vehicle seat. In its most preferred embodiment, the seat of the present invention includes a pelvis support, a pivoting thorax support and a height adjustment system for positioning the pivoting thorax support at the correct height for the seat occupant. In its most preferred embodiment, the vertical height system gives up to 100 mm of adjustment range to correctly position the thorax support for most adults.

2. Description of the Prior Art

A wide variety of comfort controlled vehicle seating systems are well-known and currently in use. Simple systems provide fore and aft adjustability and reclining of the seat back. More sophisticated seating systems add manual or power lumbar supports, vertically adjustable headrests, height and tilt controls for the seat cushion, and the like. Many of the current seats are designed and modeled for a mannequin named "OSCAR" in the industry and more specifically to the movement of OSCAR about a hip joint center.

Researchers at Michigan State University in the early 1990's began to look more carefully at actual movements of the body in an automotive vehicle setting and came up with a new model—"JOHN" named after the research sponsor, Johnson Controls, Inc.—and developed relationships between thorax and pelvic movement and the impact on lumbar curvature.

These researchers determined that there is a relationship between these two movements and that a desired curvature for the lumbar area could be created if the thorax area is moved significantly. Instead of having a lumbar support push the lumbar vertebrae forwardly (mechanical, pneumatic, manual, powered, etc.), they found that the thorax area moves in a counter rotation with respect to the pelvis. When the thorax moves forward in this model, the shoulders actually move rearwardly. This work led to the prediction that seat comfort could be enhanced if the thorax could be supported in all positions from the equivalent of JOHN being slumped forwardly on a stool to a position in which JOHN is sitting erect, with a total lumbar curvature of about 50°. The schematics discussed later in the detailed description portion of this specification illustrate several of these basic research findings.

Despite this theoretical explanation of seating comfort, developments in the 1990's continued to focus on lumbar support and lumbar height, and several vehicles currently being sold include lumbar supports that go up and down as well as in and out. While seeming to provide some comfort enhancement for vehicle seating occupants, such products ignore the research findings that comfort can, in fact, be enhanced if thorax support is also provided. Several developments in vehicle seating systems will now be discussed to illustrate the current state of this art and the variety of different directions major companies are following to provide a solution to a substantial issue, i.e., occupant comfort over a prolonged period of sitting.

As background, it is well recognized that static seats or those employing baskets, paddles and bladder systems can be used for lumbar support. The latter are all variations on a single principle. Each forces the lumbar region into a lordotic or concave shape with the intent of creating a more erect posture and hence greater comfort. Lumbar paddles and baskets can be manually operated or powered. Lumbar bladders are filled with air using a manual pump or an electrically powered pump to increase the bladder's volume and the amount of prominence into the back.

Variations on the lumbar support theory of occupant comfort are numerous. For example in U.S. Pat. No. 4,564,235 issued on Jun. 14, 1986 to Hatsutta et al, the lumbar support is split into two parts, and a cam inside the seat controls their positioning. A rotating wheel on the seat is used to rotate the cam to move the top paddle forwardly or rearwardly.

Another attempt at occupant comfort is described in U.S. Pat. No. 5,411,317 issued to Faust et al. on May 2, 1995. An important feature of this seat is a contour vortex located 250–275 mm above the seat surface combined with a rigid pelvic support 150–175 above the seat surface. This seat is static, i.e., the contour vortex and the pelvic support do not move with respect to each other.

Two additional static seats which discuss comfort are known to the present inventors. A so-called "iliac" seat has a contour in the pelvic region and an extreme amount of contour in the location of the iliac crests of the pelvis. Their purpose is to support the pelvis and avoid hyperflexion of the lower lumbar joints to eliminate the probability of pain. The second is called a New Generation Ergonomic Seat which features a lumbar support and a seat contour which is designed to provide support from the pelvis (sacrum) to the $10^{th}$ thoracic vertebrae (located at the bottom of the thorax). This seat simulates a position the body would assume if lying in a bed, a so-called "neutral" position with less curvature than would be encountered if the person was standing erect.

Another posture enhancing effort is described in U.S. Pat. No. 5,452,868 issued to Kanigowski on Sep. 26, 1995. This seat uses a gas-spring actuator to provide changes in lumbar prominence. The seat adjustment begins with maximum lumbar prominence, and by depressing a button, the occupant is able to press back into the lumbar support, compressing the gas spring and infinitely varying the amount of prominence.

A seat having a flexible contour to influence posture is described in U.S. Pat. No. 5,026,116 issued to Dal Monte on Jun. 25, 1991. The flexible elements extend vertically with the seat frame, and two transverse, rigid bars control the elements in the upper back and lumbar regions. The contour changes as the bars are moved relative to one another, i.e., when the bar located in the lumbar area moves forwardly to increase lumbar prominence, the bar in the mid-back region moves rearwardly to allow the thorax to move backwards.

Yet a further seat maneuvering system is disclosed in Serber's U.S. Pat. No. 5,558,399 issued on Sep. 24, 1996. The seat includes a cushion, a lower back support and an upper back support, the latter two being pivotally coupled in the mid-back region. The cushion moves on a pair of rollers in an arc relationship to the mid-back pivot. While the main object of the seat is safety (i.e., anti-submarining), increased comfort is attributed to the seat by the inventor.

U.S. Pat. No. 5,505,520 issued to Frusti, et al. on Apr. 9, 1996 references work by Hubbard et al. at Michigan State University and seems to incorporate some of the motions of "JOHN" described above. The seat has pelvis, lumbar and thoracic support, but movement of them is controlled solely by movement of the lumbar support. The other two are connected to it, the thoracic support being pivotally connected to the top of the seat back frame. This allows the shoulders to recline and the lower part of the thorax to be supported. The patent does not describe any vertical movement between the various body supports.

A biomechanically articulating chair has been devised and was built around the movements of the "2D JOHN" model. Allegedly it provides improved postural support by supporting the pelvis, thorax, and the lumbar region. The seat articulates as if "JOHN" pivots on the ischial tuberosites. The pelvis support pivots just under the ischial tuberosites of the occupant, while the thorax support pivots in the mid-back. The chair is intended to support the occupant through a wide range of spinal curvature and torso recline angles, thereby maintaining geometric compatibility between the height of the occupant and the seat contour to eliminate undesirable pressure distributions on the occupant. This chair is known for use in the office furniture or home fields and is not specifically illustrated for use with motor vehicle seating.

Finally, U.S. Pat. No. 6,082,823 issued to Aumont et al. on Jul. 4, 2000 describes a backrest which includes an upper backrest frame located above a lower backrest frame, the lower edge thereof be coupled to the lower backrest frame using a hinge. Pivoting of the upper portion of the back is permitted, but again there is no vertical height adjustment of the frame.

While several of the above-mentioned seat constructions can enhance occupant comfort, the present inventor believes a substantial improvement over all of them can be provided. Such improvement would be considered an important advance in this art.

FEATURES AND SUMMARY OF THE INVENTION

A primary feature of the present invention is to overcome the above-noted disadvantages of prior art seating systems by providing a seat that more closely follows the way a seated person moves, thus providing a wider range of seated positions that are available in any currently known seating.

Another feature of the present invention is to provide a seating system which adjusts to a plurality of different seated heights.

A different feature of the present invention is to reduce postural fixity, i.e., the pain in the back which results from sitting too long causing muscle fatigue, reducing creation of waste products in the skeletal system and optimizing the geometry of the vertebrae and giving the diaphragm room to expand leading to the lungs having more breathing room and capacity.

A further feature of the present invention is to provide a seating system which can be readily modified for a variety of different motor vehicle styles and which uses components which are already being used in motor vehicle seats for different purposes.

Another feature of the present invention is its ability to provide the aforementioned features for a substantial majority of people, for example, from the 5% female (height 4 ft., 11 in.) through the 95% male (6 ft., 4 in.)

How these and other features of this invention are accomplished individually, and in various combinations, will be described in the following detailed description of the preferred embodiment, taken in conjunction with the FIGURES. Generally, however, they are accomplished in a biomechanical seating system that follows the motions of the JOHN model, in which on a stool, JOHN moves from a slumped posture to an erect posture rotating about ischial tuberosities (or "set bones"). From the side, this motion looks like a pivot forming in the back of the occupant, located near the bottom of the shoulder blades. The biomechanical seat of the present invention follows such motion by first supporting the movement of the thorax with a thorax support which pivots about the bottom of the shoulder blades, and since the lower thorax has a rigid support to hold it, the shoulders will recline. By simultaneously supporting the pelvis, the linked motion between the pelvis and thorax (in the JOHN model) is continued and the lumbar vertebrae are allowed to move like a link between two rigid structures. In addition, pelvic support is more effective at controlling postural change than lumbar support. The biomechanical seat of the present invention further provides for vertical height adjustment, since the desired thorax pivot point changes depending on occupant stature. A set of seat tracks are illustrated for enabling an adjustment of about 100 mm to cover the desired pivot height range from at least the 5% female to the 95% male. Other ways in which the features of the present invention are accomplished will become apparent to those skilled in the seating art after the present specification has been studied. Such other ways are deemed to fall within the scope of the present invention if they fall within the scope of the claims which follow.

DESCRIPTION OF THE DRAWINGS

In the various FIGURES, like reference numerals are used to denote like components.

DETAILED DESCRIPTION OF THE PREFERRED EMBODIMENT

Figure 1:
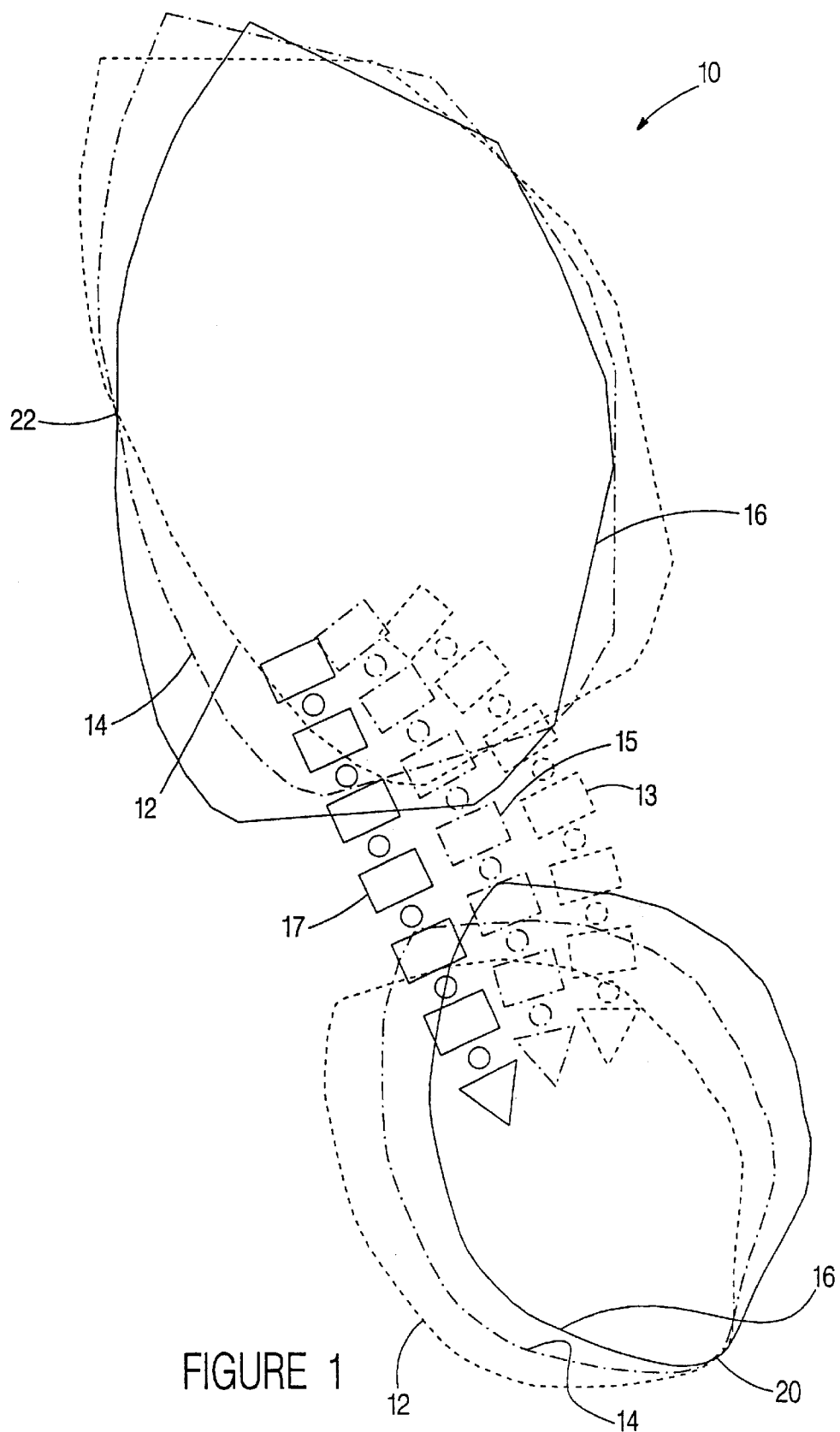
FIG. 1 is a schematic illustration of JOHN at 0, 25 and 50 degrees of total lumbar curvature.

Before beginning the detailed description of the preferred embodiment, several general comments are warranted about the applicability and the scope of the present invention.

First, the illustrations relate to a seat particularly adapted for motor vehicles, such as cars, SUVs, vans, trucks, buses and the like, but the invention is applicable also to seating used in homes, offices or other environments.

Second, the seat of the present invention is illustrated in the first few FIGURES as a padded seat having certain contours, trim and the like. While this configuration is presently preferred, a wide variety of seat configurations and appearances will benefit from use of the mechanical support and movement mechanisms described in connection with the later FIGURES. Also the exterior of the seat can be covered by fabric, vinyl, leather or other materials known and used in the seating art.

Third, with regard to the seat back mechanisms shown in the FIGURES and described later herein, substantial modifications can be made without departing from the invention's intended scope. For example, while certain mechanical systems are illustrated to move seat components to achieve certain results, other mechanisms, manual or powered could be substituted therefore. For example, where a screw drive is illustrated for use in moving the thorax pivot location, other mechanical equivalents including, but not limited to, four bar linkages, air or hydraulic cylinders, rack and pinion systems, etc. could be employed. Another example is the illustrated pelvis support, i.e., a pair of clam-shell like devices (which are themselves already known in the art). They could be replaced by other known or subsequently developed support mechanisms. These mechanisms do not, in and of themselves, form part of the present invention, but when combined with the other pivot, support, rotation and moving mechanisms define the invention and result in more comfortable seating for the occupant.

Proceeding now to the description of the preferred embodiment, reference will first be made to FIG. 1 which illustrates JOHN movements which are important to an understanding of the biomechanical seat of the present invention. The "chip" model 10 shows JOHN in three positions, a first position 12, illustrated by dashed lines, in which JOHN is slumped over, an intermediate position 14, illustrated in dash and dotted line, in which JOHN is one-half of the way to an erect position, and a third position 16, illustrated in solid line, in which JOHN is sitting erect. In the schematic diagrams, the corresponding shape of JOHN's vertebrae are also schematically illustrated at reference numerals 13, 15 and 17 using the same type of lines associated with the three positions. It will be readily noted that the vertebrae assume a straighter form as JOHN moves from the first to the third position.

FIG. 1 also shows two pivot points, one lower point 20 representing the (ischial tuberosities) and an upper pivot point 22 which is located generally at the bottom of the shoulder blades. This schematic illustration also shows how counter rotation occurs, namely that as the pelvis rolls forward, the shoulders move backwards, and the thorax moves forward creating the pivot point 22. The existence of this pivot point 22 has been recognized and addressed in prior seating systems, as indicated earlier in this specification.

Figure 2:
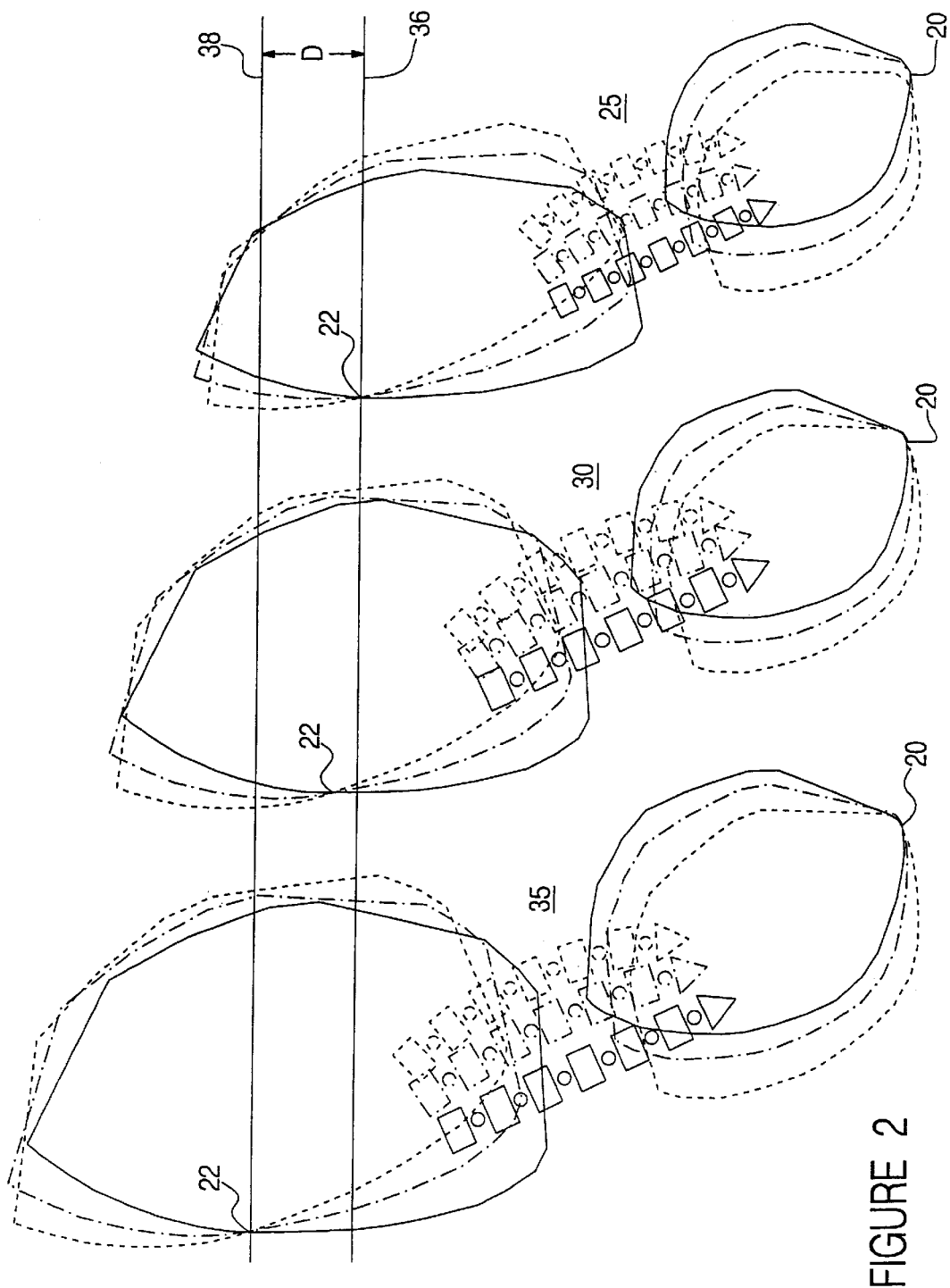
FIG. 2 is a schematic illustration of JOHN at 0, 25 and 50 degrees of total lumbar curvature, and illustrating the different pelvic skeletal lengths encountered for 95% males, 50% males and 5% females, respectively.

FIG. 2, however, shows in schematic form how the biomechanical seat of the present invention improves on such known systems. FIG. 2 shows similar chip diagrams for three occupants, a 5% female 25, a 50% male 30 and a 95% male 35. For each, the lower pivot remains substantially constant and the movements described above for JOHN in connection with FIG. 1 are repeated for each of these theoretical occupants. However, as indicated by lines 36 and 38, the upper pivot point 22 for these occupants is different for each skeletal length, and the distance D between the lines 36 and 38 is equal to about 85 mm. To take into account this variable, and to provide a biomechical seat which allows the occupant to correctly position upper pivot point 22 for his or her skeletal length, is a feature of the present invention and results in a seat having substantially enhanced comfort when compared to prior state-of-the art seating, especially motor vehicle seating.

Figure 3:
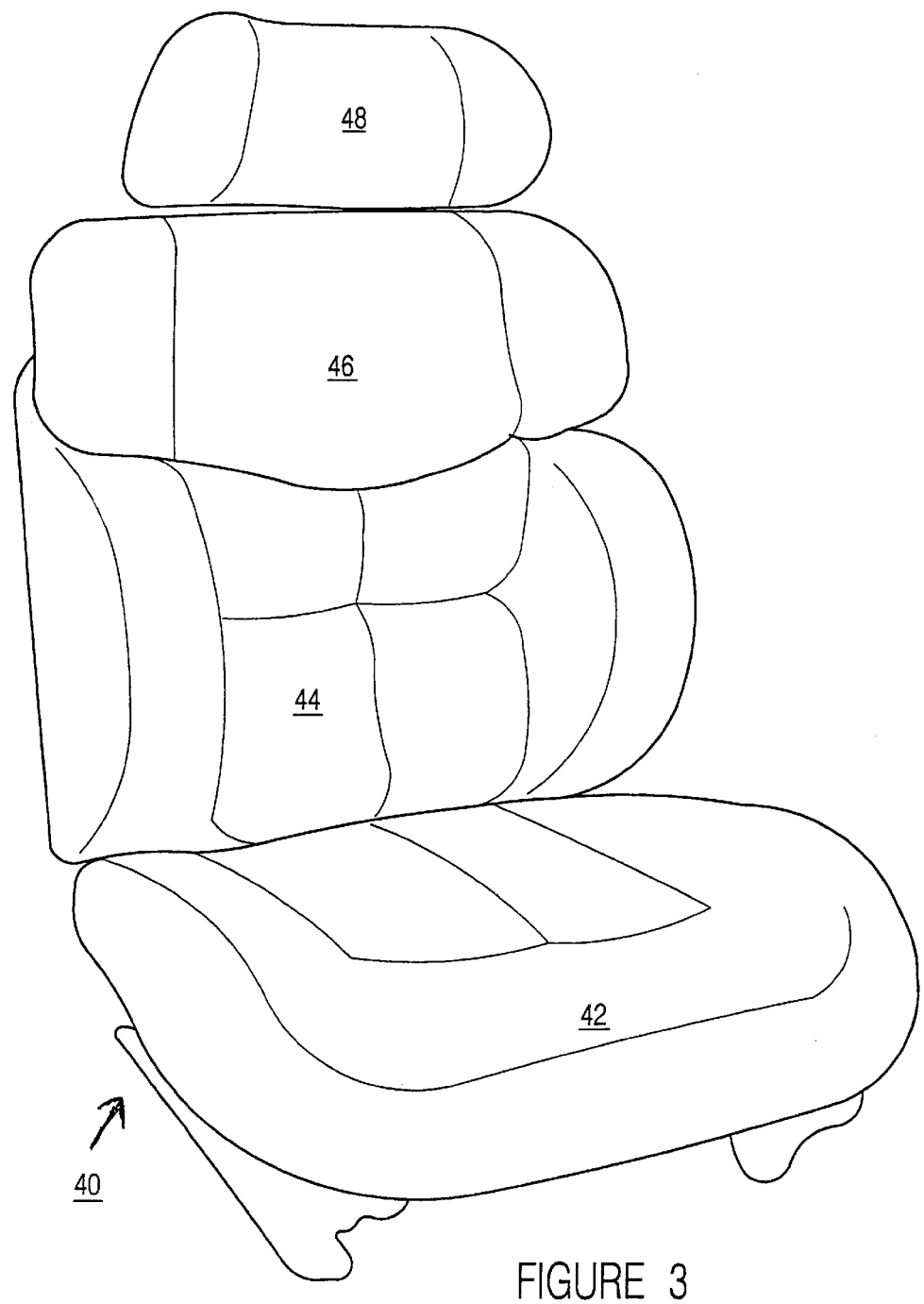
FIG. 3 is a front perspective view of a biomechanical seat according to the present invention.

FIG. 3 shows a biomechanical seat 40 according to a preferred embodiment of the present invention. As indicated earlier, the attachment of it to a vehicle is not shown, as conventional systems may be employed. Seat 40 includes a seat cushion 42, a lower pelvis support area 44, an upper pivoting thorax area 46, and an extendable headrest 48, the latter also being conventional.

Figure 4:
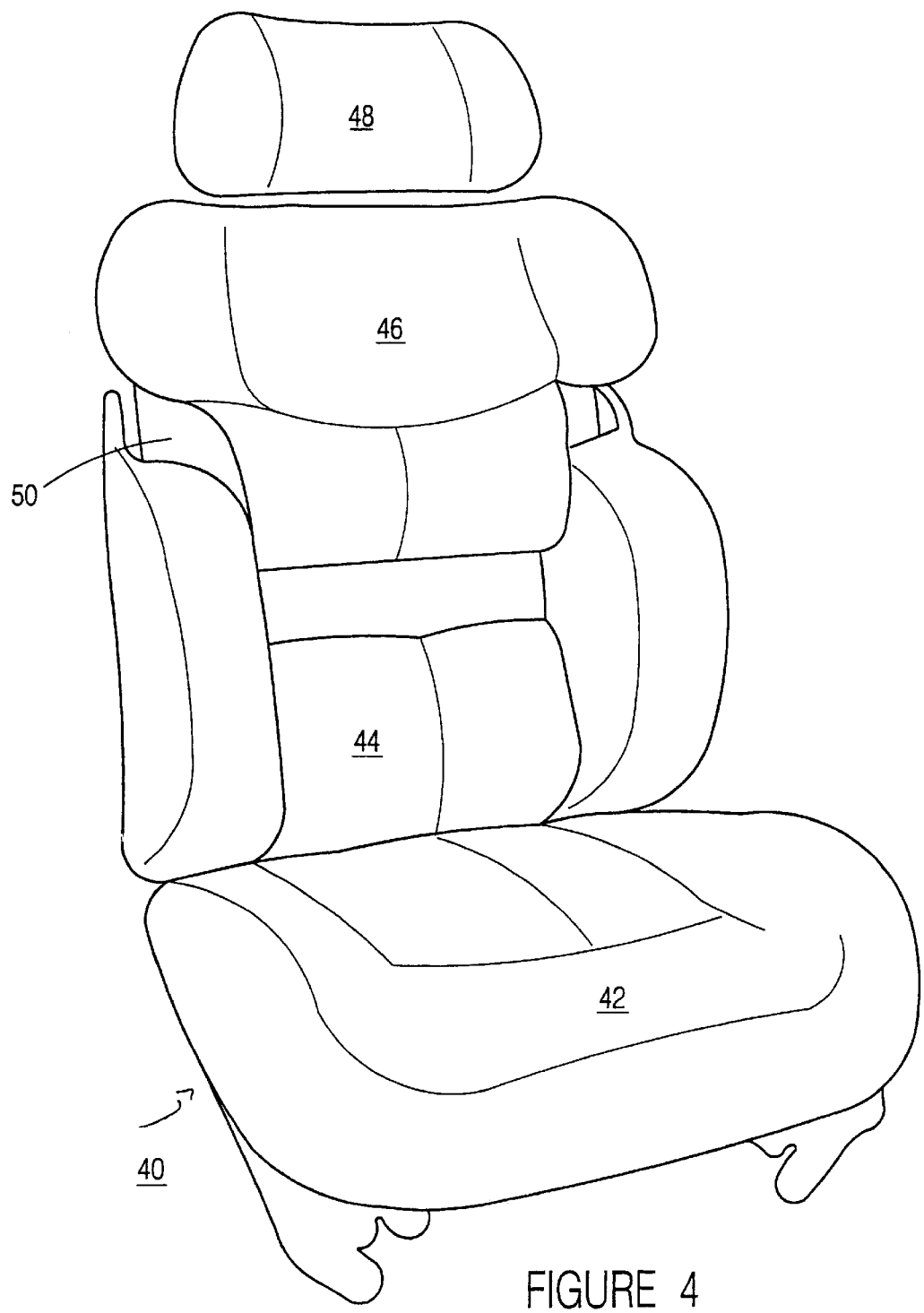
FIG. 4 is a perspective view of the seat shown in FIG. 3 with elevation of the upper pivot.

The same angle perspective view is depicted in FIG. 4, except that a space 50 is depicted between support areas 44 and 46. That space indicates that the pivoting thorax support area 46 is spaced further from the pelvis support area 44 than was shown in FIG. 3, and as will be seen in subsequent FIGURES, the pivot axis for support area 46 has been elevated, to provide a new comfort control adjustment for the seat occupant.

Figure 5:
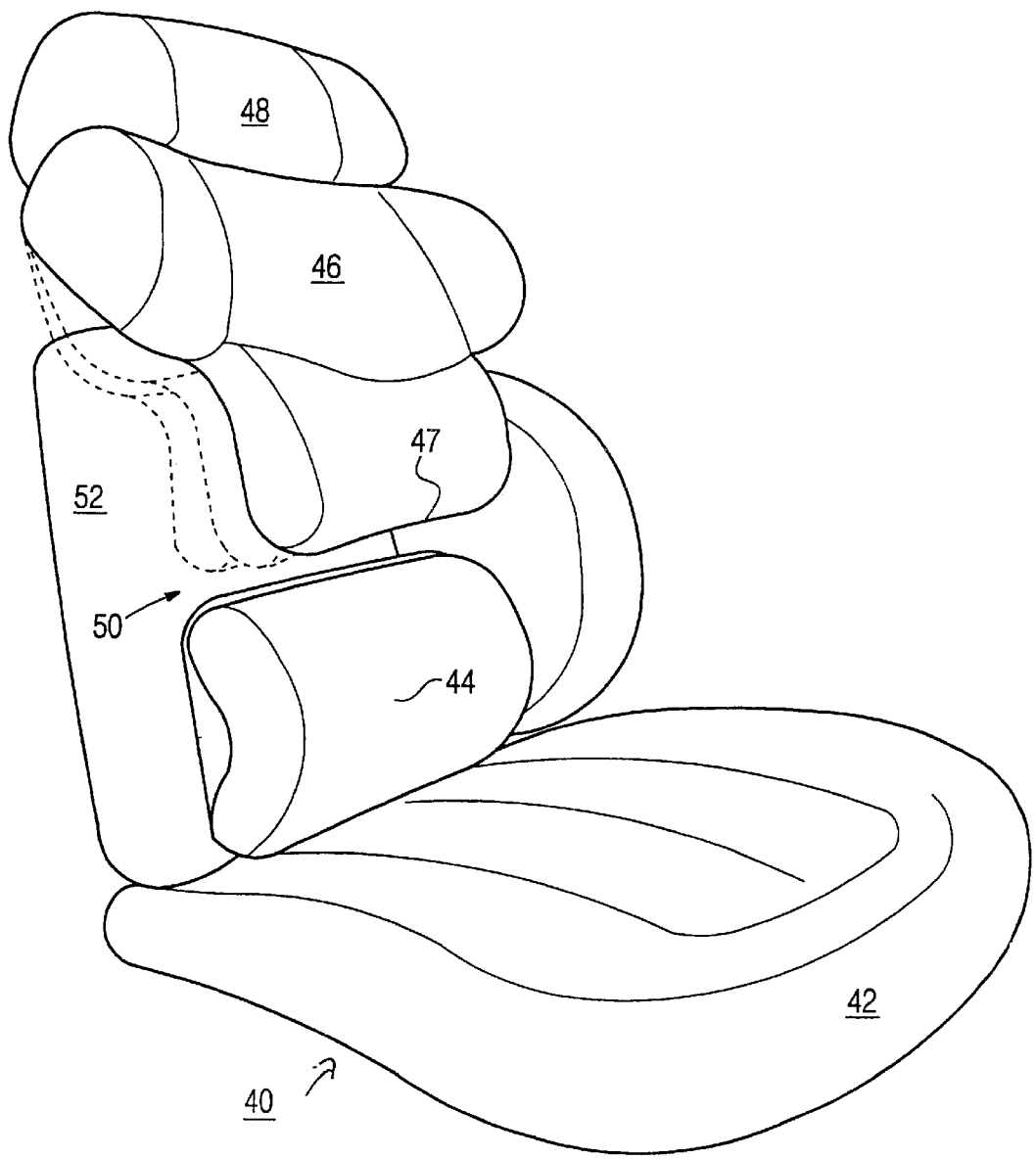
FIG. 5 is a perspective view of the seat shown in FIG. 3, with the upper pivot rotated about the upper pivot axis.

FIG. 5 is another perspective view of seat 40, but in this FIGURE, the view is taken more from the side to illustrate the pivoting motion for support area 46. A first extreme is illustrated in full line and shows the bottom 47 of support area 46 extending away from the seat back 52, while in dashed lines, the support area 46 is shown retracted to an intermediate position. The other extreme position in which the upper portion of area 46 extends forwardly is shown in dotted lines. As will soon become apparent, the upper support area can move to any position between these extremes depending upon the skeletal length of the seat occupant.

Figure 6:
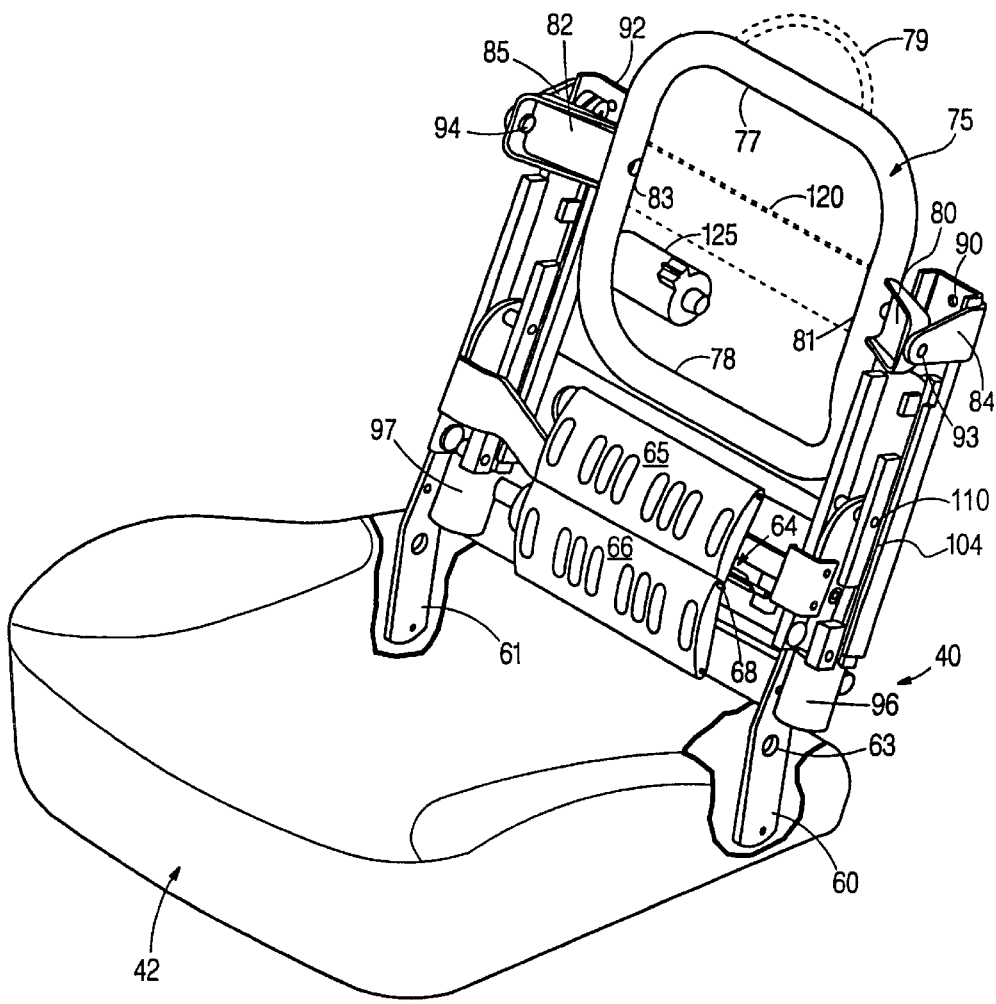
FIG. 6 is a perspective view of the inner components of a biomechanical seat according to the preferred embodiment of the invention.
Figure 7:
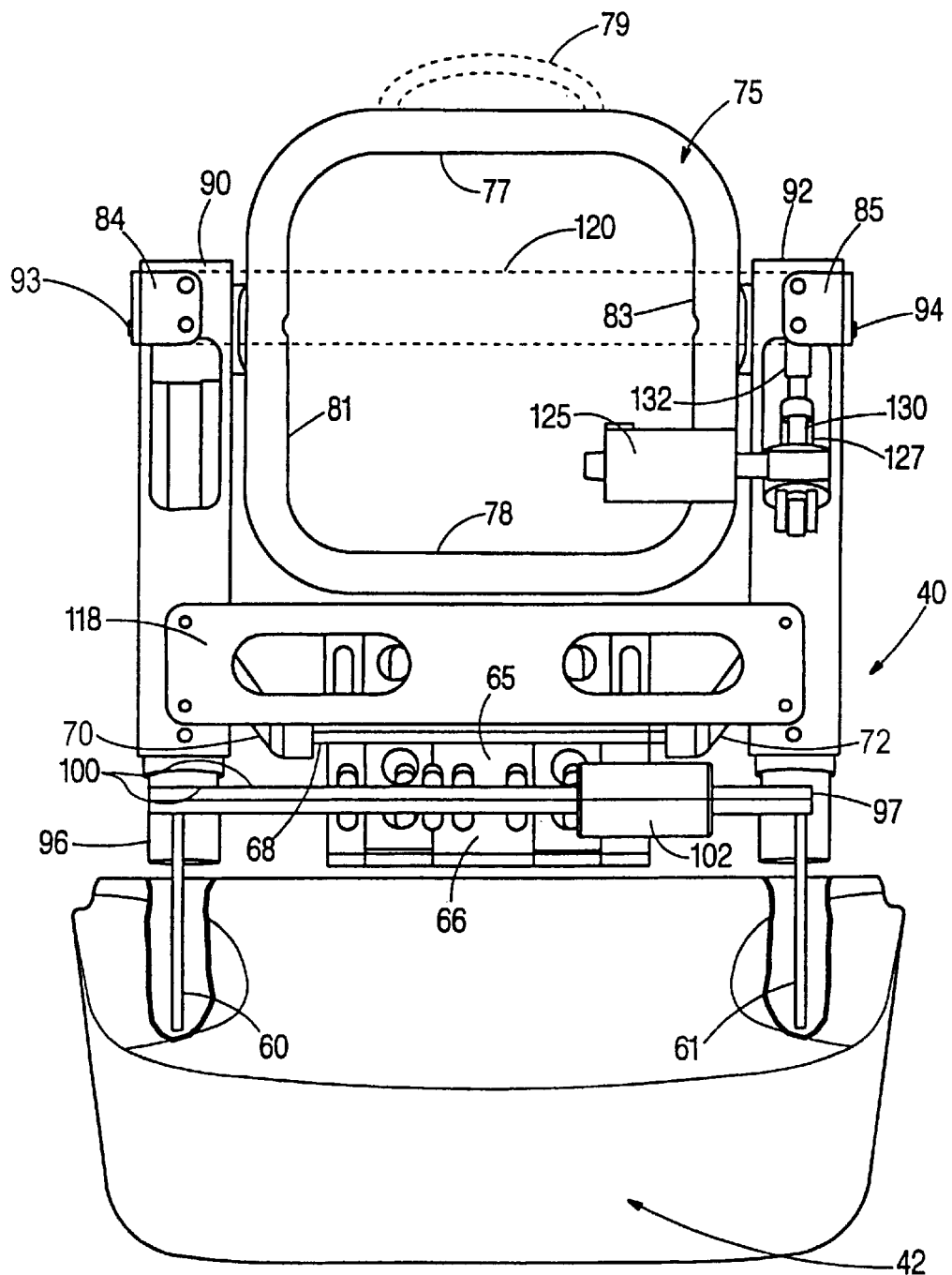
FIG. 7 is a back view of the seat shown in FIG. 6.
Figure 8:
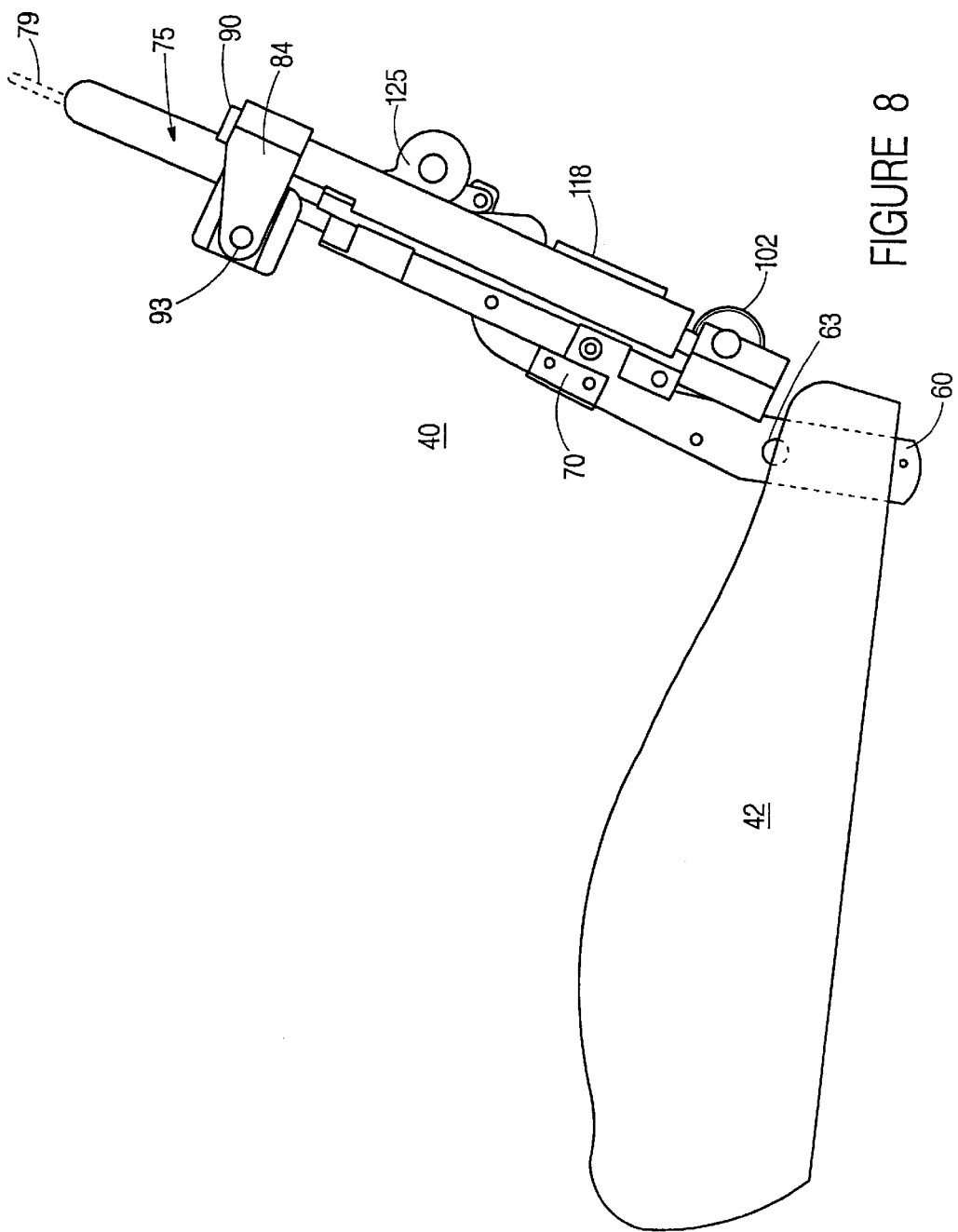
FIG. 8 is a side view of the seat shown in FIGS. 6 and 7.

Proceeding next to FIG. 6, a corner front perspective view of the seat 40 with some of its padding and trim removed, the internal mechanisms used in the preferred embodiment are illustrated. FIG. 7 is a back view of the same seat 40, while FIG. 8 is a side view. Before describing the components which are unique in the combination depicted as seat 40, reference should again be made to the fact that other adjustment and comfort features could be used in seat 40. For instance, the cushion 42 could be heated or ventilated, and known recliner mechanisms could be employed. Likewise, tilt, and fore and aft adjustment systems could also be employed.

Back frame supports 60, 61 are shown near the rear and outer corners of cushion area 42. These metal stampings serve to support certain adjustable body support areas of the invention and would be part of a standard recliner mechanism to allow the entire back of seat 40 to pivot about the recline pivot axis 63. Reference to FIG. 6 indicates that the pelvis support portion 44 includes a pelvis support 64 supported by side brackets 70, 72. The pelvis support 64 is comprised of two clam-shell like stampings 65, 66 joined along confronting edges by a hinge 68. This particular arrangement for the pelvis support 64 is known, and the manual or power components used for movement of stampings 65, 66 may be selected from those described in the Background section of this specification or elsewhere in the art.

Proceeding now to a description of the pivoting thorax support area 46 of seat 40, FIG. 6 illustrates a substantially square, tubular frame 75 having an open center. Shown in dotted line at the top 77 of frame 75 is a support 79 for headrest 48 which is conventional and will not be described further in this specification. A pair of brackets 80, 82 extend outwardly from sides 81, 83 of the frame 75 and are pivotally coupled to brackets 84, 85 located respectively on the upper portions of movable height adjustable back frame members 90, 92 (to be described in greater detail later). Pins 93, 94 provide the rotatable coupling and permit the frame 75 to pivot about an axis defined by pins 93 and 94. Such rotation causes the top 77 of frame 75 to move rearwardly or forwardly and the bottom 78 of frame 75 to follow the opposite path.

Adjustability of the height of the upper support area 46 is provided by movement between front portions 96, 97 of a height adjustable back frame with respect to the rear portions 90 and 92 previously described. Portions 90 and 92 move upwardly and downwardly with respect to portions 96 and 97. The way in which this is accomplished in the preferred embodiment is through the use of a cable and motor system best seen in FIG. 7, the cables being represented at 100 and the motor at 102. As the motor 102 drives the cable 100, a screw drive 104 located on each of the lower height adjustable back frame members 96, 97 spins causing a follower 110 fixedly attached to the rear portion of the height adjustable seat back frames 90 and 92 to move, causing a resultant movement in portions 90 and 92 with respect to portions 96 and 97. As indicated previously, a number of other track adjustment systems can also be employed, including those typically used for fore and aft adjustment of vehicle seats. Such mechanisms as rack and pinion gearing, four bar linkages and the like can be employed. While a motor 102 is shown for movement of the cables 100, a wheel could also be used for the manual rotation of the screw drive. From this description, it will be apparent that as movement occurs of portions 90 and 92, the upper frame 75 moves with respect to the cushion 42 between the extremes illustrated in FIG. 4.

With further reference to FIG. 7, additional componentry used in the preferred embodiment can be explained. First, a stiffener 118 is secured to the lower portions 96 and 97 to prevent "matchboxing" between the left and right sides of the back frame, and an upper stiffener could be added between brackets 84 and 85, as illustrated at 120 in phantom line in FIG. 7.

The final components to be described for the biomechanical seat 40 of the present invention are the components necessary to move frame 75 about the axis of pins 93 and 94. In the preferred embodiment, a motor 125 is coupled to a screw drive assembly 127 which operates on the principle of a bell crank. As seen in FIG. 7, the motor will drive a screw 130 which causes extension and retraction of a nut 132 coupled to bracket 85 at a location above pin 94, to permit the frame 75 to move between the positions illustrated in full and dotted line in FIG. 5. Electrical connections between motors 102 and 105 are conventional and are not shown for purposes for providing greater clarity in these drawings.

The biomechanical seat of the present invention functions through several variables to provide optimum comfort to the seat occupant, combining pelvis support, forward movement of the thorax and rearward movement of the shoulders. And while a single preferred embodiment is shown, the invention is not be limited thereby but is to be limited solely by the scope of the claims which follow.

What is claimed is:

1. A seat for a vehicle having a bottom seat cushion and a back comprising a lower back portion and an upper back portion, the upper back portion being supported by frame members and being pivotable about an axis extending transversely of the seat back, the upper back portion having a right side, a left side, a center line centrally located between the right and left sides, a lower edge and an upper edge, the pivot axis being located intermediate the lower edge and the upper edge, the lower edge extending across the center line at a point below the pivot axis whereby the lower edge of the back portion may pivot forwardly with respect to the seat back while the upper edge moves rearwardly with respect to the seat back, and vice versa, and wherein the seat also includes an adjustment mechanism for moving the distance of the pivot axis with respect to the lower back portion between a first position in which the lower edge of the upper back portion adjoins the lower back portion to a second position in which the lower edge of the upper back portion is spaced apart from the lower back portion.

2. The seat of claim 1, wherein a pelvis support is located within the lower back portion.

3. The seat of claim 2, wherein the pelvis support extends and retracts an exterior, forwardly facing surface of the lower back portion.

4. The seat of claim 2, wherein the pelvis support is a mechanical device including a pair of plates hinged along adjoining edges.

5. The seat of claim 1, wherein each side of the upper back portion is mounted to a first track section, the seat back having a second track section on each side, the two pairs of tracks engaging one another, and wherein the seat further includes an adjuster for moving the first track sections with respect to the second track sections.

6. The seat of claim 5, wherein the adjuster includes a screw drive located on each of the second track sections and a follower is located on each of the first rack sections, whereby the upper seat portion moves when the screw drive is rotated.

7. The seat of claim 6, wherein the seat includes a motor and the motor is coupled to each screw drive by cables.

8. The seat of claim 1, wherein the upper back portion includes an elongate, upper portion frame member on each side thereof, an open center frame having a top, a bottom and parallel sides, the sides of the frame being coupled to the upper portion frame members by brackets and by pins having a common axis.

9. The seat of claim 8, wherein the upper seat portion also includes a tilt mechanism for pivoting the frame about the pin axis.

10. The seat of claim 9, wherein a motor is mounted to one of the upper portion frame members and is coupled to a bracket to pivot the upper seat back portion.

11. A vehicle seat for supporting an occupant, the seat comprising: a seat cushion, a pelvic support, a seat back comprising a thorax support including an upper edge, a lower edge, a right side, a left side and a center line between the right and left sides, the thorax support pivots about an axis and is transverse of the seat back, the lower edge extending across the center line at a point below the pivot axis, pivoting of the thorax support urges the occupant's thorax region forwardly and simultaneously urges the occupant's shoulders rearwardly, the vehicle seat further comprising an adjustment system for varying the distance between the pivot axis and the seat cushion to accommodate occupants having a variety of skeletal lengths.

12. The seat of claim 11, wherein the adjustment system has a range of adjustment of between about 50 and 100 mm.

13. The seat of claim 11, wherein the adjustment system has a range of adjustment exceeding 85 mm.

14. The seat of claim 11, wherein the adjustment system comprises a fixed track mounted to the seat back and a movable track mounted to the pivoting thorax support.

15. The seat of claim 14, wherein a motor moves the movable track with respect to the fixed track.

16. The seat of claim 11, wherein the thorax support comprises a frame having sides and side brackets, the seat back having upper frame members and frame brackets, the side brackets and frame brackets being pivotably coupled by pins having a common axis.

* * * * *